Patented Apr. 4, 1944

2,345,956

UNITED STATES PATENT OFFICE 2,345,956

NONLIVERING COATING COMPOSITION

Herbert L. Wampner, Terre Haute, Ind., assignor to Commercial Solvents Corporation, Terre Haute, Ind., a corporation of Maryland No Drawing. Application November 12, 1942, Serial No. 465,386

7 Claims. (Cl. 106—193)

My invention relates to improvements in synthetic resin and cellulose ester bronzing lacquers. More specifically, my invention is concerned with the production of lacquers of this character possessing increased resistance to gelling or livering.

A relatively large number of synthetic resins, particularly those of the alkyd type, have been developed for use in the preparation of coating materials. Such resins, which are usually of the glycerol and phthalic anhydride type, have been modified in numerous ways, such as, for example, by the introduction of drying oils, non-drying, or semi-drying oils, phenol aldehyde resins, and the like, to improve their solubility in organic solvents, and in some cases to impart drying or oxidizing properties thereto. All of these resins are useful as basic film-forming ingredients of varnishes or enamels, or as supplementary film-forming ingredients in lacquers. It has been found, however, that lacquers of this type cannot be satisfactorily used in combination with bronze powders because of the pronounced tendency of the former to gel or liver under such conditions. Similar difficulties are encountered with cellulose ester bronzing lacquers.

The livering of coating materials of the above types may take the form of either gellation of the entire coating material, or agglomeration of a part of the lacquer or enamel into large particles, leaving the remainder as a liquid. The former is the more common form of this phenomenon, but even in this case agglomerates may be found in the gelled material. In the case of coating compositions containing relatively large amounts of bronze powders and/or various types of resins possessing livering tendencies, the gellation may occur shortly after the preparation of the coating material, and nearly always within 24 hours. Certain factors, such as the acidity of the various lacquer components, the quantity and composition of the bronze powders utilized, the temperature at which the bronzing lacquer is permitted to stand, etc., will, in general, determine the speed at which livering sets in.

It is an object of my invention to provide both synthetic resin and cellulose ester bronzing lacquers, which possess a pronounced tendency to resist livering for a sufficient period of time, to render the use of such lacquers practicable over extended working periods.

Previously, it has been attempted to overcome these difficulties by modifying the resins contained in lacquers in which a synthetic resin or resins constituted the principal film-forming materials. None of such attempts, however, has met with success. If the nature of the resin is changed in such a manner as to avoid livering, the desirable film-forming properties are also modified to such an extent that the composition is substantially useless for coating purposes. Efforts to avoid this difficulty by neutralizing the acidity of the resins have also consistently met with failure.

The tendency of synthetic resin and cellulose ester bronzing lacquers to liver has, in the past, been substantially reduced by the addition of a relatively small amount of malic acid or the alkali metal salts of malic acid to said lacquers during the formulation thereof. Although these processes have met with certain degrees of success, they possess various drawbacks which render them very impractical for numerous commercial applications. For example, because of the low degree of solubility of both the free malic acid and the alkali metal salts thereof in the common organic solvents, it is difficult to prepare stock solutions of these bronzing lacquers containing malic acid, or such salts, in amounts sufficient to have any appreciable gel-inhibiting effect. Also, in the case of lacquers stabilized with malic acid, the increased acidity in the lacquer, owing to the presence of said malic acid, renders the use of these coating compositions highly impracticable for coating metals because of the deleterious effects of such compositions thereon. Furthermore, aluminum bronze, which finds wide application in the coating field, loses its leafing ability when present in synthetic resins or cellulose ester lacquers containing free malic acid.

In my copending application, U. S. Serial No. 410,439, filed September 11, 1941, I have shown that the above-mentioned disadvantages of previous bronzing lacquer compositions may be very satisfactorily overcome by the use of certain neutral malic salts of aminodioxanes. The particular aminodioxanes there described were prepared from the corresponding nitrodioxanes, which, in turn, were synthesized by condensing a nitro glycol with a suitable aldehyde. I have now discovered that anti-livering agents which serve equally well to inhibit the formation of gels in lacquers of the above-described type, may be prepared by reacting an aminodioxane, derived from anamino glycol and a suitable ketone, with malic acid. In order to bring about the desired results, only relatively small quantities of such neutral malic acid salts need be added. The aforesaid anti-livering agents being neutral salts of malic acid, possess the following general structural formula:

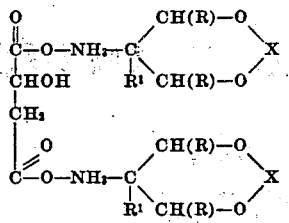

in which R may be either hydrogen, alkyl, aryl, or furyl; R¹ may represent hydrogen, alkyl, or alpha-hydroxyalkyl, and X represents one of the group cycloalkylidene, alkyl-substituted cycloalkylidene, and

in which R² and R³ may be either alkyl, aryl, or aralkyl.

The quantity of the above-mentioned compounds necessary to prevent livering or agglomeration of the coating material, in general will be found to depend upon the amount of bronze powders employed, and also upon the character of the film-forming agent utilized. On certain occasions I have found that the tendency of such compositions to gel, has been greatly decreased by incorporating therein as little as 0.07 per cent, based upon the weight of the solid present, of a neutral malic acid salt of the class mentioned above. Generally the use of from approximately 0.10 per cent to 3.0 per cent will be found adequate to prevent gelling during practical working periods.

In this connection, it should also be emphasized that as a direct result of the present invention, it has been made possible to prevent gelling of bronzing lacquers over extended periods of time, i. e., for the ordinary shelf life of the coating materials. This result may be accomplished by replacing a portion of the plasticizer present by a concentrate containing a malic acid salt of the aforesaid type. Such concentrate may constitute the crude reaction mixture resulting from the production of said malic acid salts, as described below. The composition and quantity of the concentrate required to render bronzing lacquers of the class described substantially permanently free from any tendency to gel or liver, will be found to vary with the composition of the lacquer. However, I have found that from about 25 per cent to 65 per cent of said concentrate, based upon the weight of the film-forming agent present, is generally sufficient to inhibit the occurrence of livering when the lacquers are stored over extended periods of time.

Bronzing lacquers in which these neutral salts of malic acid have been incorporated, possess none of the previously-mentioned disadvantages exhibited by such compositions which employ malic acid or alkali metal salts of malic acid as an anti-livering or anti-gelling agent. On the contrary, stock solutions of such lacquers may be readily prepared and stored for long periods, due to the high degree of solubility of these particular salts in the common organic solvents. Furthermore, coating materials which contain such salts do not attack metal surfaces, and, in addition, possess a high degree of color stability.

The malic acid salts employed in the preparation of non-livering coating compositions of the present invention, may be produced in any convenient manner. For example, the desired aminodioxane and solvent mixture may be mixed together, after which malic acid can then be slowly added thereto with thorough agitation, and the agitation continued until the solution is complete. This procedure is preferably carried out at a temperature of 50°–60° C., and such conditions tend to increase the rate of solution. The solvent mixture, referred to above, preferably consists of a suitable plasticizer, such as butyl phthalate, a dihydric alcohol, such as 2-methyl-2,4-pentanediol, together with a third solvent, for example, butyl "carbitol."

The aminodioxanes utilized in preparing the anti-gelling agents of the present invention, include 5-amino-5-hydroxymethyl-2,2-dimethyl-1,3-dioxane, 5-amino-2,5-diethyl-2-methyl-1,3-dioxane, 5-amino-5-ethyl-2-isobutyl-2-methyl-1,3-dioxane, 5-amino-5-hydroxymethyl-2-benzyl-2-methyl-1,3-dioxane, 5-amino-5-methyl-2,2-diphenyl-1,3-dioxane, 5-amino-5-methyl-2,2-pentamethylene-1,3-dioxane, 5-amino-5-ethyl-2,2-(1-methylpentamethylene)-1,3-dioxane, 5-amino-5-methyl-2,2-tetramethylene-1,3-dioxane, and the like.

These aminodioxanes may be prepared in accordance with any convenient method. I prefer, however, to produce such compounds by the procedure described in copending application, U. S. Serial No. 437,359, filed April 2, 1942, by Murray Senkus. In accordance with the process there described, the corresponding nitrodioxane is subjected to hydrogenation at a pressure of approximately 2000 pounds per square inch, and at a temperature of about 25°–30° C., in the presence of a nickel hydrogenation catalyst and a suitable solvent, such as methanol. The nitrodioxane employed as the starting material in the above-mentioned process, may be conveniently prepared by heating equivalent quantities of a suitable polyhydroxy nitro compound, and a ketone, in the presence of a small amount of an acid catalyst, such as hydrochloric acid, and, if desired, in the presence of an organic liquid, such as benzene or toluene, which is capable of removing the water produced during the reaction, in the form of a constant boiling mixture. This reaction is very general in character, and may be effected between a large number of ketones and polyhydroxy nitro compounds.

Other standard ingredients of synthetic resin and cellulose ester bronzing lacquers may be incorporated in the lacquers in accordance with standard formulation procedures. Any of the standard plasticizers, resins, and the like, may be employed, but I prefer to use ingredients which are not appreciably acidic in nature. This is particularly true with respect to resins, and I prefer, for this reason, to employ specific resins, such as the alkyd or phenol-aldehyde resins, which are in general more neutral in reaction than such materials as the natural resins, especially where the coating of metal surfaces is involved.

The examples following are illustrative of the scope of the present invention.

Example I

A lacquer was prepared containing 10 parts by weight of ¼ sec. nitrocellulose, 4 parts of butyl phthalate, 10 parts of ester gum, and 100 parts of a solvent mixture of the following composition:

|  | Per cent by volume |
| --- | --- |
| Butyl acetate | 20 |
| Ethyl acetate | 15 |
| Ethyl alcohol | 15 |
| Toluene | 50 |

Copper bronze was then added to two samples of the clear lacquer prepared as described above, in a concentration of approximately 7 per cent by weight of the prepared lacquer, and to one of these samples was added 0.25 per cent by weight of 2,5 - diethyl - 2-methyl-1,3-dioxane-5-ammonium malate, based upon the solids present. Each of the samples of bronzing lacquer was thoroughly mixed and permitted to stand for 24 hours, at the end of which period the samples were examined. The bronzing lacquer containing no 2,5-diethyl-2-methyl-1,3-dioxane-5-ammonium malate had set to a thick gel, whereas the viscosity of the sample to which the 2,5-diethyl-2-methyl-1,3 - dioxane - 5 - ammonium malate had been added, remained substantially unchanged at the end of 72 hours.

The following example demonstrates the ability of the malic acid salts of the present invention to inhibit livering in bronzing lacquers in which drying oil modified glycerol-phthalate resins, are employed.

Example II

A bronzing lacquer was prepared by dissolving the following ingredients in 100 cc. of xylene:

|  | Grams |
| --- | --- |
| Drying oil modified glycerol-phthalate resin | 35 |
| Copper bronze | 20 |
| 2 - benzyl-5-hydroxymethyl-2-methyl-1,3-dioxane-5-ammonium malate | 1.5 |

The bronzing lacquer having the above composition retained a viscosity suited to the common methods of application for a period of three days, whereas the same bronzing lacquer, which contained no 2-benzyl-5-hydroxymethyl-2-methyl-1,3-dioxane-5-ammonium malate had set to a viscous gel after a period of eight hours.

The above examples are merely illustrative, and do not in any way limit the scope of the present invention. As has been previously pointed out, the formulation of the bronzing lacquers may be varied in numerous respects in accordance with standard formulation procedures. For instance, I have observed that clear lacquers, of the type described in the foregoing examples, will on contact with lead or lead compounds, likewise tend to rapidly form gels. I have found, however, that gelation of these lacquers, under such conditions, may also be inhibited by the use of my new anti-livering agents. Accordingly, it is intended that the term "bronze powder" appearing in the appended claims be construed to cover lead or its compounds.

The various embodiments of the present invention, illustrated by the above examples, are obviously subject to numerous modifications. Therefore, it is to be specifically understood that I do not desire to restrict myself to the particular bronzing lacquers, and to the methods for obtaining the same, which have been set forth in the examples, but it is intended that the present invention shall include, by the terminology employed in the following claims, all features of patentable novelty inherent therein.

Having now described my invention, what I claim is:

1. A coating composition free from basic pigments, but having reduced tendency to liver or agglomerate, which comprises a bronze powder, a film-forming agent selected from the group consisting of cellulose esters and modified ester resins formed from polyhydric alcohols and polybasic acids, and a neutral salt of malic acid of the following structural formula

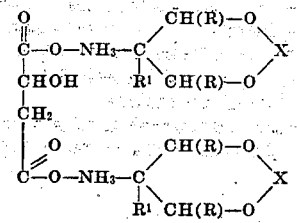

in which R is a member of the class consisting of hydrogen, alkyl, aryl, and furyl; $R^1$ is a member of the class consisting of hydrogen, alkyl, and alphahydroxyalkyl, and X is a member of the group consisting of cycloalkylidene, alkyl-substituted cycloalkylidene, and

wherein $R^2$ and $R^3$ represent members of the group consisting of alkyl, aryl, and aralkyl.

2. A coating composition free from basic pigments, but having reduced tendency to liver or agglomerate, which comprises a bronze powder, a cellulose ester, and a neutral salt of malic acid of the following formula:

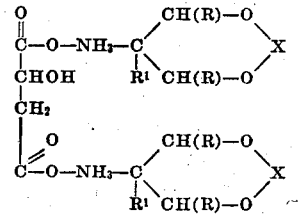

in which R is a member of the class consisting of hydrogen, alkyl, aryl, and furyl; $R^1$ is a member of the class consisting of hydrogen, alkyl, and alpha-hydroxyalkyl, and X is a member of the group consisting of cycloalkylidene, alkyl-substitued cycloalkylidene, and

wherein $R^2$ and $R^3$ represent members of the group consisting of alkyl, aryl, and aralkyl.

3. A coating composition free from basic pigments but having reduced tendency to liver or agglomerate, which comprises a bronze powder, cellulose nitrate, and a neutral salt of malic acid of the following structural formula:

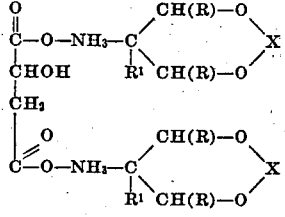

in which R represents a member of the group consisting of hydrogen, alkyl, aryl, and furyl; $R^1$ is a member of the group consisting of hydrogen, alkyl, and alpha-hydroxyalkyl; and X is a member of the group consisting of cycloalkylidene, alkyl-substituted cycloalkylidene, and

in which $R^2$ and $R^3$ represent members of the group consisting of alkyl, aryl, and aralkyl.

4. A coating composition free from basic pigments, but having reduced tendency to liver or agglomerate, which comprises a bronze powder, a cellulose ester, and 2,5-diethyl-2-methyl-1,3-dioxane-5-ammonium malate.

5. A coating composition free from basic pigments, but having reduced tendency to liver or agglomerate, which comprises a bronze powder, a modified ester resin formed from polyhydric alcohols and polybasic acids, and 2-benzyl-5-hydroxymethyl-2-methyl-1,3-dioxane-5-ammonium malate.

6. A coating composition free from basic pigments, but having reduced tendency to liver or agglomerate, which comprises a bronze powder, a modified ester resin formed from polyhydric alcohols and polybasic acids, and 2,2-dimethyl-5-hydroxymethyl-1,3-dioxane-5-ammonium malate.

7. A coating composition free from basic pigments, but having reduced tendency to liver or agglomerate, which comprises a bronze powder, cellulose nitrate, and 2,5-diethyl-2-methyl-1,3-dioxane-5-ammonium malate.

HERBERT L. WAMPNER.